United States Patent [19]
Kakegawa

[11] 3,805,823
[45] Apr. 23, 1974

[54] PRESSURE REGULATORS
[75] Inventor: Yasuo Kakegawa, Tokyo, Japan
[73] Assignee: Tokyo Gas Company Limited, Tokyo, Japan
[22] Filed: May 23, 1972
[21] Appl. No.: 255,994

[52] U.S. Cl. ............................................. 137/489
[51] Int. Cl. ............................................ G05d 7/03
[58] Field of Search ..... 137/489, 489.5, 492, 492.5, 137/81, 114, 512.15, 63 R, 88, 604; 128/142.2, 142

[56] References Cited
UNITED STATES PATENTS
| | | | |
|---|---|---|---|
| 3,526,241 | 9/1970 | Veit | 137/489 X |
| 1,457,049 | 5/1923 | Webb | 137/489 X |
| 3,036,778 | 5/1962 | Dillman | 137/489 X |

Primary Examiner—Henry T. Klinksiek
Assistant Examiner—Robert J. Miller
Attorney, Agent, or Firm—Wenderoth, Lind & Ponack

[57] ABSTRACT

In a pressure regulator of the type comprising a main regulator and a pilot regulator, an orifice is formed through a valve-operating main diaphragm communicating both sides of the main diaphragm with each other. One side of the pilot regulator is communicated with one side of the main diaphragm, while the other side thereof is communicated with the secondary low pressure side of the system. The flow rate of fluid passing through the orifice is regulated by the pilot regulator, whereby a pressure difference between both sides of the main diaphragm is varied and thereby the degree of opening of its valve is adjusted, so that the fluid pressure on the secondary low pressure side may be maintained constant.

3 Claims, 2 Drawing Figures

PRESSURE REGULATORS

1. Field of the Invention:

This invention relates to a fluid pressure regulator.

2. Description of the Prior Art:

In a conventional pressure control device comprising a pilot regulator, the pressure on the downstream side is supplied to one side of a diaphragm or the like which operates a valve of a main regulator, and the loading pressure is supplied to the other side of such diaphragm or the like through the pilot regultor. Therefore, both the pilot regulator and main regulator have been complicated in construction and difficult to handle.

SUMMARY OF THE INVENTION:

The present invention provides a pressure regulator in which both chambers in a main regulator, devided by a main diaphragm or piston disposed in said main regulator, are communicated with each other by an orifice. The flow rate of fluid passing through such orifice is controlled by a pilot regulator communicating at one side with a low pressure conduit on the downstream side, to vary the pressure difference between both sides of the orifice or the pressure difference between the chambers on both sides of the main diaphragm or piston and thereby to adjust the degree of opening of a main valve connected to the main diaphragm or piston, whereby the pressure on the downstream side is maintained constant.

Figure 1:
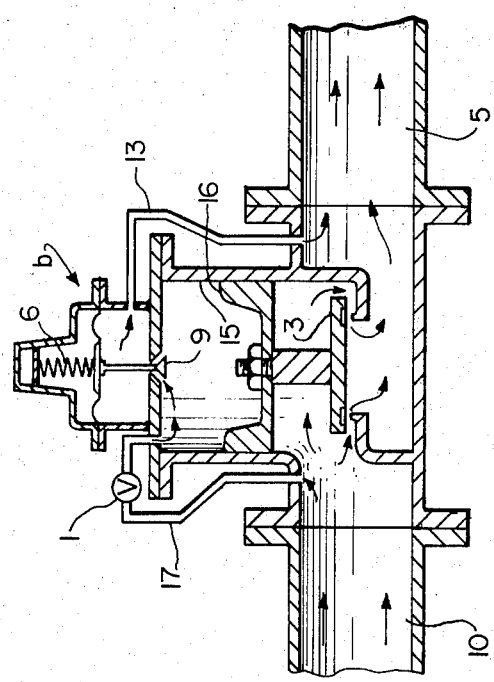
FIG. 1 is a sectional view diagrammatically showing a gas pressure regulator embodying the present invention.
Figure 2:
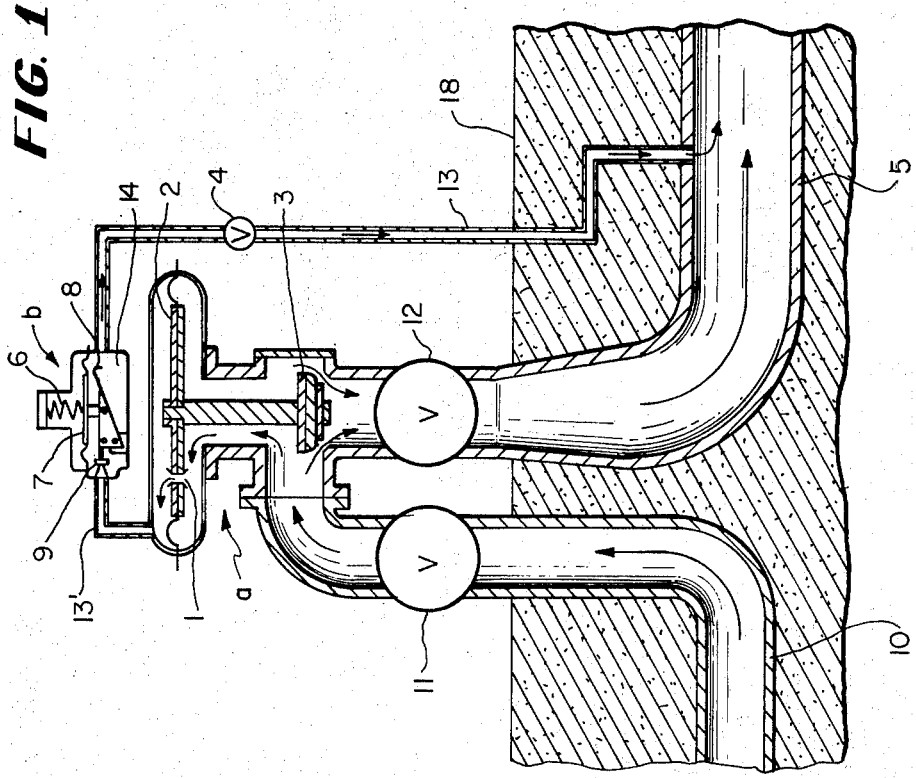
FIG. 2 is a sectional view diagrammatically showing a liquid pressure regulator according to the invention.

DESCRIPTION OF THE PREFERRED EMBODIMENTS:

The present invention will be described with reference first to FIG. 1 showing an embodiment in which the invention is applied to a gas pressure regulator. In FIG. 1, reference character $a$ generally designates a main regulator. The main regulator $a$ is provided therein with movable means such as a main diaphgram 2 which divides the main regulator into two chambers. Extending through the diaphragm 2 is an orifice 1 which provides communication between the chambers. This orifice 1 may alternatively be provided by a bypass conduit 17, such as shown in FIG. 2. The main diaphragm 2 has a main valve 3 integrally connected thereto. Reference character $b$ generally designates a pilot regulator and which communicates at one side through one opening thereof with a low pressure conduit 5 on the downstream side of the system through a stop valve 4 in a conduit 13. The other side of the pilot regulator $b$ communicates through another opening thereof with one side of the diaphragm 2 in the main regulator $a$ through a conduit 13'. The pilot regulator $b$ may include, for example, a pilot diaphragm 7 provided with a secondary pressure setting spring 6 and connected to a lever 8. A pilot valve 9 is provided at one end of lever 8 so that the degree of opening of pilot valve 9 may be adjusted by the movement of the pilot diaphragm 7.

Reference numeral 10 designates a high pressure conduit on the primary side, 11 is a stop valve on the primary side and 12 is a stop valve on the secondary side.

First of all, the overall flow of gas in the construction described above will be explained. Gas being supplied at a high pressure flows into the main regulator $a$ through the high pressure conduit 10 and primary stop valve 11 as indicated by the arrows. Then a major portion of the gas flows through the main valve 3 and secondary stop valve 12 into the low pressure conduit 5, while a minor portion of the gas flows into one side of the main diaphragm 2 and thence into the other side thereof through the orifice 1, and then into the low pressure conduit 5 after passing through the conduit 13', the pilot regulator $b$ and the conduit 13. When the pressurized gas has reached the upper side of the main valve 3, since the pressure on the underside of said main valve is relatively low, the main valve undergoes a downward force which is the product of the surface area of main valve 3 and the pressure difference between both sides of the main valve. Therefore, it will be understood that, in order to lift the main valve 3 to permit the gas to flow into the low pressure conduit, it is necessary to apply to the main valve 3 an upward force greater than the sum of the aforesaid downward force and the weights of the main diaphragm 2 and the movable portion of the main valve 3. This upward force can be created by making the pressure difference between both sides of the main diaphragm 2 large, and this pressure difference is determined by the flow rate of gas passing through the orifice 1. It is the pilot regulator $b$, which regulates the flow rate of gas passing through the orifice 1 and thereby controls the pressure difference between both sides of the main diaphragm 2 in such a manner that a desired degree of opening of the main valve 3 may be obtained.

Now, let it be assumed that the usage of gas on the low pressure secondary side increases, and that the pressure of gas on the high pressure primary side remains constant. The gas pressure in the secondary conduit 5 will become lower than a preset pressure if the degree of opening of the main valve 3 remains the same. When the pressure in the secondary low pressure conduit 5, i.e., the pressure in a chamber 14 in the pilot regulator $b$ communicating with the secondary low pressure conduit 5 through the conduit 13, decreases, the pilot diaphragm 7 is depressed by the secondary pressure setting spring 6, and the opening of the pilot valve 9 is increased by the lever 8. Thus, the flow rate of gas passing through the pilot regulator $b$ increases. Namely, the flow rate of gas passing through the orifice 1 into the conduit 13' increases. When the flow rate of gas flowing into the pilot regulator $b$ increases, since the pressure on one side or on the underside as viewed in FIG, 1, of the main diaphragm 2 is constant, the pressure on the other side of the main diaphragm 2 decreases due to the restriction of the orifice 1, so that the upward force applied to the main diaphragm 2 increases and the opening of the main valve 3 increases. In the manner described, the opening of the main valve 3 increases until the upward force applied to the pilot diaphragm 7 balances the depression of the secondary pressure setting spring 6.

On the other hand, when the usage of low pressure gas on the secondary side decreases, the opening of the pilot valve 9 is decreased by the lever 8, and the flow rate of gas flowing into the pilot regulator *b* decreases. Therefore, the pressure difference between both sides of the main diaphragm 2 decreases and the opening of the main valve 3 decreases to maintain the pressure of gas on the secondary side constant.

Now, when the pressure of gas on the high pressure primary side increases while the pressure of gas on the low pressure secondary side is being controlled at a predetermined level and the amount of gas used on the secondary side is constant, the pressure difference between both sides of the main valve 3 increases and a downward force is applied thereto. If in this case, the pressure difference on both sides of the main diaphragm 2 is unchanged, the opening of the main valve 3 will decrease due to the increase of downward force. When the opening of the main valve 3 decreases, the pressure in the secondary low pressure conduit 5, i.e., the pressure on the underside of the pilot diaphragm 7 as viewed in FIG. 1 becomes smaller than the preset value and the pilot diaphragm 7 is depressed by the secondary pressure setting spring 6, with the result that the opening of the pilot valve 9 increases and the flow rate of gas flowing into the pilot regulator *b* increases. Consequently, the pressure difference between both sides of the main diaphragm 2 becomes large and an upward force acts on the main valve 3. Thus, the opening of the main valve 3 is increased until the pressure in the low pressure conduit 5 on the secondary side and, therefore, the pressure in the chamber 14 in the pilot regulator *b* reaches the preset value. Conversely, when the pressure on the primary side decreases, the opening of the pilot valve 9 decreases until the opening of the main valve 3 decreases to a degree at which the prssure in the low pressure conduit 5 on the secondary side becomes constant.

Another embodiment of the present invention will be described with reference to FIG. 2, in which the present invention is applied to the regulation of liquid pressure. In FIG. 2, a main valve 3 is operated by a pressure difference between both sides of a piston 16 which is slidably disposed in a cylinder 15. This pressure difference is varied by varying the flow rate of a liquid passing through a variable orifice 1 provided in a primary side pressure supply conduit 17, upon manipulating a pilot valve 9 of a pilot regulator *b* in communication with the secondary side of the system through a conduit 13. The operation of this liquid pressure regulator is exactly the same as that of the gas pressure regulator described above and the pressure in the secondary side low pressure conduit 5 is set by a spring 6 provided in the pilot regulator *b* as in case of the gas pressure regulator.

As described herein, according to the present invention the regulation of gas or liquid pressure can be achieved by a combination of a main regulator and a pilot regulator, both of a simple construction.

As compared with the conventional pressure regulator the gas or liquid pressure regulator embodying the present invention is much simpler in construction and also much easier to handle. Furthermore, the pressure regulator of the invention requires a very small mounting space on the ground 18, if the main regulator *a* is of the angle valve type as shown in FIG. 1. It should also be noted that, since the main valve 3 is a single seat valve, the valve closing pressure becomes higher as the pressure on the primary side increases, and thus leakage of gas or liquid through the valve can be eliminated when the valve is in its closed position, whereby an adjusting operation is not required as would be necessary in the case of a valve having double seats.

What is claimed is:

1. A pressure regulator comprising a main regulator; movable means dividing said main regulator into two chambers; bypass means providing communication between said two chambers; a main valve seat; a main valve connected to said movable means and movable therewith to open and close contact with said main valve seat in response to movement of said movable means; a primary high pressure conduit means connected to a first of said chambers and to a first side of said main valve for supplying fluid under high pressure to said first chamber at a position immediately adjacent said main valve seat; a secondary low pressure conduit means connected to a second side of said main valve for directing said fluid from said first chamber under a reduced pressure; whereby communication between said high and low pressure conduit means is opened and closed in response to opening and closing of said main valve; and a pilot regulator having a first opening communicating with a second of said chambers, a pilot valve means for selectively opening and closing said first opening, and a second opening communicating with said low pressure conduit.

2. A pressure regulator as claimed in claim 1, wherein said movable means comprises a main diaphragm, and said bypass means comprises an orifice extending through said main diaphragm.

3. A pressure regulator as claimed in claim 1, wherein said main regulator includes a cylinder, said movable means comprises a piston movable within said cylinder, and said bypass means comprises a conduit having therein an orifice.

* * * * *